United States Patent [19]
Crean et al.

[11] Patent Number: 5,745,249
[45] Date of Patent: Apr. 28, 1998

[54] PIPELINED ARCHITECTURE FOR PATTERNED HALFTONE GENERATION

[75] Inventors: Peter A. Crean, Penfield; Norman W. Zeck, Webster, both of N.Y.

[73] Assignee: Xerox Corporation, Stamford, Conn.

[21] Appl. No.: 770,922

[22] Filed: Dec. 20, 1996

[51] Int. Cl.$^6$ .............................. H04N 1/40; G06K 9/54
[52] U.S. Cl. .................. 358/298; 358/456; 358/460; 382/303; 382/304
[58] Field of Search .................................... 358/298, 434, 358/444, 456–460; 382/234, 302–304

[56] References Cited

U.S. PATENT DOCUMENTS

| | | | |
|---|---|---|---|
| 4,149,194 | 4/1979 | Holladay | 358/283 |
| 4,185,304 | 1/1980 | Halladay | 358/298 |
| 4,817,175 | 3/1989 | Tenenbaum et al. | 382/303 |
| 4,918,622 | 4/1990 | Granger et al. | 358/298 X |
| 5,493,419 | 2/1996 | Jadoin et al. | 358/456 X |

*Primary Examiner*—Eric Frahm
*Attorney, Agent, or Firm*—Duane C. Basch

[57] ABSTRACT

The present invention is a super-scalar method and apparatus for the generation of halftone dot patterns in an image processing system. The super-scalar design employs at least one block of memory for the storage of at least one predetermined halftone dot pattern across a plurality of unique locations therein, and a sequencer for producing an index into said memory as a function of the position of the pixel along a scan line and the halftone dot characteristics. Also included is addressing circuitry for memory access control, to combine the index produced by said sequencer and a pixel value for the pixel to produce a memory address, the memory address being thereby employed to access one of said locations in memory and to cause said memory to output a signal representative of a portion of the halftone dot pattern stored at the unique addressed location.

18 Claims, 8 Drawing Sheets

25, 26, 27, 28, 21, 22, 23, 24, 25, 26, 28, 21

PIPELINED ARCHITECTURE FOR PATTERNED HALFTONE GENERATION

This invention relates generally to a pipelined image processing architecture for patterned halftone generation and more particularly to a super-pipelined, super-scalar design for the generation of halftone dot patterns in an image processing system employing a sequencer and/or parallel memory channels.

BACKGROUND AND SUMMARY OF THE INVENTION

The present invention is a simple, super-pipelined, super-scalar architecture for a patterned halftone dot generation system which efficiently offers: a set of unconstrained Holladay halftone patterns; monotonic and non-monotonic patterns; supercell support for accurate angles and pseudo-stochastic patterns; use of inexpensive DRAM; low gate count; and full programmability.

Electronic halftoning is used in many color printing products. For example, in the Xerox 5765 Color Copier, and color laser printers available from other manufacturers, analog electronic circuits have been employed to generate the halftone patterns. In the Xerox 5775 Color Copier, digital electronics control each pixel of the laser pattern to produce sophisticated, two dimensional patterns. The demands of higher resolution, larger screen patterns, and higher process speed not only raising the cost but a difficulty with employing traditional halftone electronics such as that used in 5775. The higher process speeds that will be required in future color printing products make the halftoning circuitry a critical element.

Heretofore, a number of patents and publications have disclosed, the relevant portions of which may be briefly summarized as follows:

U.S. Pat. No. 4,149,194 and U.S. Pat. No. 4,185,304 to Holladay, issued Apr. 10, 1979 and Jan. 22, 1980, respectively, disclose a method for halftoning a digital image using a rotated angle screen. The basis for the technique was the use of a repeating block of screen values, wherein the angle of the screen and growth of the halftone dot was controlled by the shift applied to subsequent instances of the block.

In accordance with the present invention, there is provided an apparatus for the parallel processing of a pixel value for a continuous tone pixel to produce a halftone output signal representing the continuous tone pixel, comprising: a memory block storing at least a portion of a halftone dot pattern at a plurality of unique locations therein; a sequencer for producing an index into said memory as a function of a position of the pixel and the halftone dot characteristics; and memory addressing circuitry for combining the index produced by said sequencer and a pixel value for the pixel to produce a memory address, the memory address being thereby employed to access one of said locations in memory and to cause said memory to output a signal representative of a portion of the halftone dot pattern stored at the unique memory location.

In accordance with another aspect of the present invention, there is provided a method for parallel processing pixel values for at least two continuous tone pixels to produce a plurality of binary signals representing the at least two continuous tone pixels, comprising: preprogramming halftone dot patterns at a plurality of unique locations in memory; and producing an index into said memory as a function of a position of the pixel and the halftone dot characteristics; combining, with the index, a pixel value for the pixel to produce a memory address; and using the memory address, accessing a location in said memory blocks, thereby causing the memory to output a signal representative of a portion of the halftone dot pattern stored at the accessed memory location.

In accordance with yet another aspect of the present invention, there is provided an apparatus for the parallel processing of a pixel value for a continuous tone pixel to produce an encoded output signal, where the encoded output signal may be employed to drive an image output device to produce a representation of the continuous tone pixel, comprising: a memory block storing at least a portion of an encoded pattern at a plurality of unique locations therein; a sequencer for producing an index into said memory as a function of a position of the pixel within the image; and memory addressing circuitry for combining the index produced by said sequencer and a pixel value for the pixel to produce a memory address, the memory address being thereby employed to access one of said locations in memory and to cause said memory to output the encoded output signal.

One aspect of the invention deals with a basic problem in digital halftoning—half speed, cost effective generation of halftone dots for digital printing and copying systems.

This aspect is further based on the discovery of a technique that alleviates this problem. The technique offers full programmability to achieve unconstrained halftone patterns, support for accurate angles and pseudo-stochastic patterns and above all hardware efficiency so as to minimize cost.

The architecture described briefly above is unique in its high speed, its low cost, and in the strength of its total features. The techniques described herein are advantageous because they are efficient, simple and inexpensive compared to other approaches, while meeting the demands for higher process speeds in digital color printing products of the future. The design of the invention is advantageous because it provides a range of halftone dot patterns by enabling programmability in a computationally efficient manner. The design also employs a pipelined architecture wherein execution speed of the various operations is improved by breaking the operations into simpler steps that are executed in overlapped sequence. Furthermore, the super-scalar aspects of the design allow the system to execute different operations in parallel, in distinct hardware, when the operations are independent. A wide variety of operations can be implemented using these techniques, including accurate angle and pseudo-stochastic screening operations.

BRIEF-DESCRIPTION OF THE DRAWINGS

Figure 1:
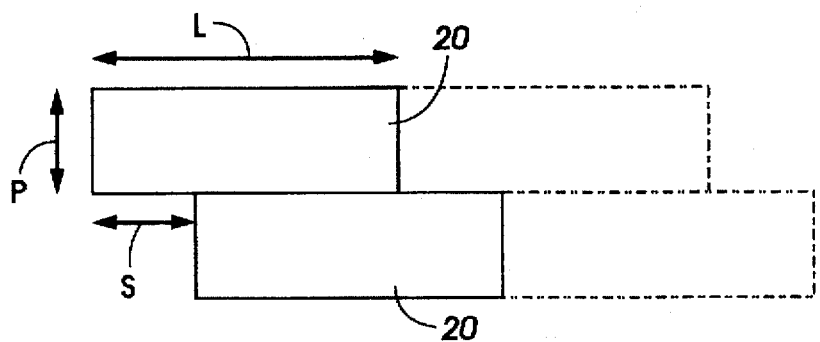
FIG. 1 is a representation of relationship between multiple halftone cells or bricks as would be applied to an image.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. "Logic" is circuitry that can respond to the first data by providing different data at another location or time in a determinstic manner, so that whenever an item of logic is in a given state, it responds to the first data in the same way. Logic can include circuitry that transfers and stores data. Logic that provides data to be transferred from a first location to a second location "transmits" the data, while logic at the second location "receives" the data.

A "processor" or "processing circuitry" is any combination of circuitry that can perform operations on data. A "processing unit" is a processor. "Memory circuitry" or "memory" is any circuitry that can store data, and may include local and remote memory and input/output devices. Examples include semiconductor ROMs, $E^2$PROMs, RAMs, DRAMs, and storage medium access devices with data storage media that they can access. A "memory cell" is memory circuitry that can store a single unit of data, such as a bit or other n-ary digit or an analog value.

A "register" is memory circuitry that includes an array of memory cells for temporary storage of data. A "shift register" is a register in which the data stored in each of the memory cells can be shifted along a dimension of the array to a next memory cell. If the shift register includes a one-dimensionial array of memory cells, each storing a bit of data, the shifting operation can receive and store a series of bits of data or it can provide a series of bits of data as output.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

An "image" is a pattern of physical light. An image may include characters, words, and text as well as other features such as graphics. A text may be included in a set of one or more images, such as in images of the pages of a document. An image may be divided into "segments", each of which is itself an image. A segment of an image may be of any size up to and including the whole image.

Each location in an image may be called a "pixel.": In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimenisional array defining an image.

An operation performs "image processing" when it operates on an item of data that relates to part of an image. An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

An "image input device" is a device that can receive an image and provide an item of data defining a version of the image. A "scanner" is an image input device that receives an image by a scanning operation, such as by scanning a document.

An "image output device" is a device that can receive an item of data defining an image and provide the image as output. A "display" is an image output device that provides the output image in human viewable form. A "printer", such as a Raster Output Scanner (ROS), is an image output device provides the output image in a hard copy document form. The visible pattern presented by a display is a "displayed image" or simply "image".

The process of "halftoning" uses binary (e.g., color/no-color, black/white) pixels printed in patterns that, when viewed by the human eye at appropriate distances, are integrated by the human vision system to appear as gray levels. In this process, there is a direct relationship and tradeoff between the resolution of the binary pixels and the number of gray levels. If the resolution of a continuous tone input image and the resolution of a binary halftone output image are the same, some of the edge information at the input resolution will be lost during the process of rendering the output image with halftone patterns. To compensate for this loss, the output resolution at the Raster Output Scanner (ROS) is often much higher than the input resolution of the continuous tone image data. This added resolution in the output image is used to make halftone dots of different sizes to represent levels of gray and still maintain some edge information.

Figure 2:
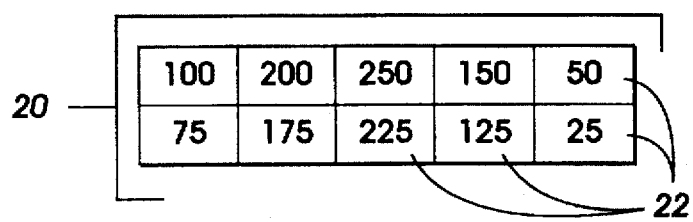
FIG. 2 is a detailed illustration of threshold values found in a typical halftone cell.
Figure 3:
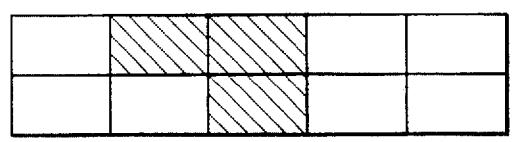
FIG. 3 is a binary output pattern representative of a possible output achieved with the halftone cell thresholds of FIG. 2.

FIG. 1 shows the basic Holladay halftone approach that uses a "brick" 20 (L×P) of threshold values that are employed to control how the halftone dot grows and a shift parameter (S) to obtain various angles. Further details on the basic Holladay techniques can be found in U.S. Pat. No. 4,149,194 (issued Apr. 10, 1979) and U.S. Pat. No. 4,185,304 (issued Jan. 22, 1980) both to Holladay, and both hereby incorporated by reference for their teachings. The threshold values for pixel locations within a brick are compared with the continuous tone level of the current pixel and the output binary pixel is set (on) or cleared (off) based on this comparison. FIG. 2 is an example of a brick 20 of threshold levels and FIG. 3 is an example of the binary pixels that would output using such a brick for a continuous tone level range of 176–199.

The process for halftoning a digital image consists of comparing threshold values in the pixel locations 22 within a brick 20 with the continuous tone pixel values and then indexing to the next pixel location in the brick. Each row in the brick is used on a separate scan line or raster of the binary output. Thus, for each output scan line the next row of thresholds within the brick is used, until the last row at which time it begins anew with the top row of the brick. In general the process can be represented as after P rows or lines of pixels have been processed, the brick is shifted by S columns and the process is repeated. The shift is done modulo the length of the brick L. The modulus function requires a division, whereas the remainder is used as a start index into a row of the brick.

Digital halftone systems used in the Xerox 5775 describe the dot as a threshold array which generate monotonic dots, i.e. a higher density pattern uses all the pixels turned on by all lower dots, or in other words, once a dot is turned on, it stays on. This dot progression has advantages, but the freedom to turn dots on as well as off in a density progression has advantages including smoother constant colors. A pattern dot halftoning process, on the other hand, stores unique patterns for each density level and inserts them into the pixel stream in response to an incoming continuous tone pixel value. These patterns may be filled in a monotonic, non-monotonic, pseudo-stochastic or other manner. Moreover, in high addressability printing engines, each incoming pixel controls the output level of a plurality of adjacent printable pixels.

A further distinction between halftoning using threshold dots and patterned dots is that in thresholded dot halftoning a value is stored for each output pixel, requiring that several decisions be made for each outgoing pixel. Conversely, in the patterned dot halftoning process, a single decision is made and the string of pixels corresponding to the requested density is fetched or retrieved in a single operation. The use of patterned dots for halftoning is known. For example, the PostScript interpreter available from Adobe, Inc. uses pattern dots for performance reasons, even when the dot function is described by some type of threshold function.

Pipelining is a digital architecture design technique wherein the execution speed of various operations is improved by breaking the operations into several simpler steps which can be executed in an overlapped sequence, rather than singly and sequentially. As will be appreciated by those skilled in the art of digital circuit design and image processing, a certain degree of independence of the operations is required to allow pipelining within an image processing system. In contrast, in a super-scalar architecture, different operations are executed in parallel in distinct hardware when the operations are independent, i.e. neither operation depends on the outcome of the other.

Figure 4:
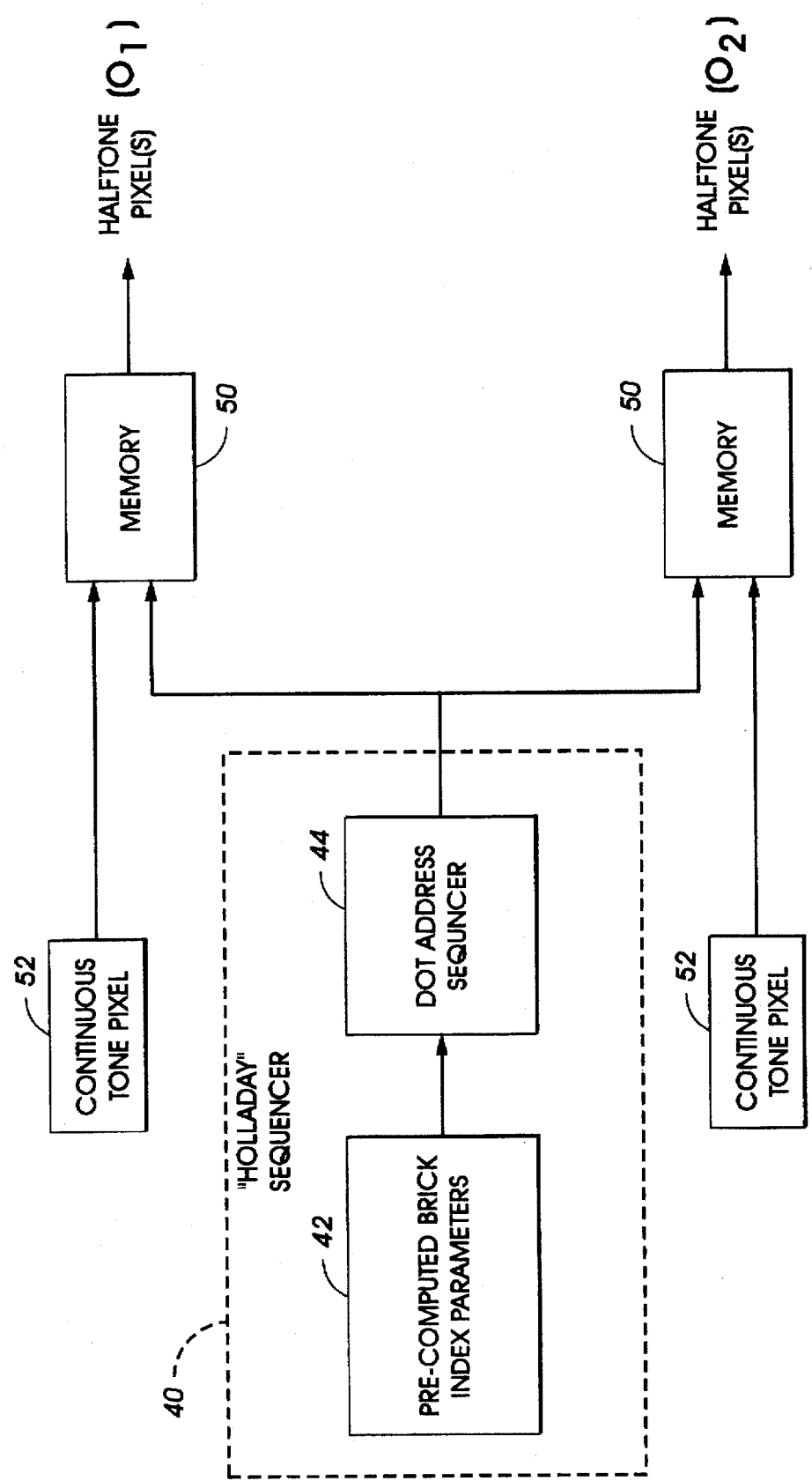
FIG. 4 is a simple block diagram of the general components of an image processing apparatus in accordance with the present invention.

The architecture of the parallel (or super scalar) halftone generation is depicted in the block diagram of FIG. 4. A key to this technique is a reduction of the complexity of the general Holladay halftoning algorithm to a series of easy to implement functional blocks. By choice of the data that is coded into the memory block and the block index parameters that are precomputed, the complexity of the implementation is greatly reduced. Further, choice of the memory coding and use of the continuous tone pixel as an input to the memory block allows multiple continuous tone pixels to be halftoned in parallel. In addition, multiple pixels at the device resolution can be generated to produce a plurality of output signals for what is often referred to high addressable pixels.

Such an approach is particularly efficient when the halftone design has a number of levels approaching the number of levels resolved by the continuous tone pixel value. It is very simple in gate count and complexity. Dots with different angles or frequencies require individual Holladay sequencers. The sequencers output a unique set of numbers which uniquely identify the relative cell in the respective dot, but are otherwise constrained. Changing sequencers would switch between dots to support the requirements of, for example, process controls, customer selection, and/or object optimized rendering. However, while requiring different sequencers, these dots can efficiently share a common memory.

For purposes of the following description the output resolution will be given in terms of a scale relative to the input resolution. For example, output={4×,1×} means the fast scan resolution, pixels, are 4 times the input resolution while the slow scan resolution, scan lines, is one times the input resolution.

Figure 5:
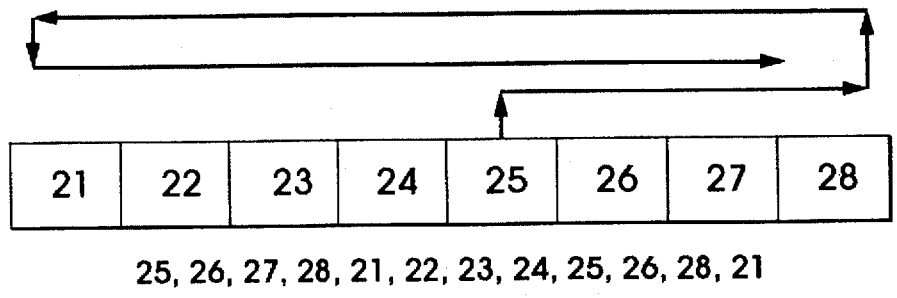
FIGS. 5 and 6 illustrate examples of the repetitive nature of halftoning operations using variable angle screen when applied to large regions of an image.

Referring again to FIG. 4, depicted therein is a "Holladay" sequencer 40, providing circuitry for indexing into the memory 50, to sequence through the halftone dot and maintain the phase and repeat frequency. The functional requirements of sequencer 40 are that it be able to initialize at the beginning of a scan line, start at an offset location in memory representing an offset within the brick, count to an end location and reset back to a start location. Sequencer 40, as depicted in the figure, includes a first circuit for precomputing the brick index parameters, block 42. The precomputed brick parameters (e.g., offset within the brick) are then fed to the second circuit, dot address sequencer 44, where the initial and subsequent Holladay address components are generated for each pixel. The start to end counting sequence is repeated until the end of the scan line as represented by FIG. 5.

At the end of a scan line, but before processing of the next scan line, the offset, start, and end control parameters are updated within control registers of the sequencer (not shown) from the pre-computed brick index parameters. These parameters are a circular sequence of {offset, start, end} control parameters. The parameters are derived from the Holladay brick length (L), height (P), and shift (S), but are different in that they reflect the coding of the halftone dot in memory. For example, the length of the count sequence will, at a maximum, be L. In some cases, depending on the value of the L and the binary output resolution, this count may be shorter. For example, {L=16, output={8×,1,}} will require only two locations in memory (count sequence length=2). Note that in the above example, there may be more total memory locations required within memory blocks 50, depending on the magnitude of S and P, but that the count on any given row will remain at two.

As a practical note, in some cases the row will only take up one memory location. However, in certain situations the digital pipeline delays may not make it efficient, or even possible, to address only one memory location and repeat the addressing sequence for only that one location. In this case, the code may simply be replicated in memory and the count increased to improve performance.

Figure 6:
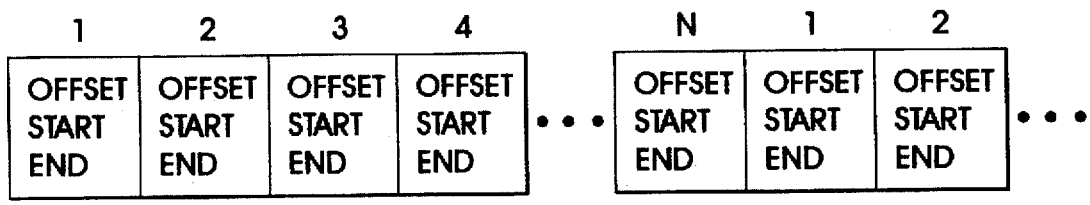

Lastly, at a point where the brick starts at the beginning of the scan line, back in phase with the first scan line, the parameter sequence repeats as shown in FIG. 6. Furthermore, there may be different implementations of these control parameters such as {offset start, length offset, length cycle} to implement the same function.

The memory blocks 50 in FIG. 4 each are depicted as having two primary inputs. The first input is the output of the Sequencer 40 that controls the sequencing into the brick that describes the halftone dot. The second input is the pixel(s) or more appropriately pixel value(s) to be halftoned, stored, for example in a latch 52 or similar circuitry. Although shown with two inputs, it will be appreciated by those skilled in the art of digital design that the two inputs are preferably combined into a single memory address by a multi-bit latch (not shown) or equivalent logic circuitry. Using such circuitry, the sequencer output (most significant) may be combined with the pixel value(s) (least significant) to produce the memory address. Combination of the sequencer and pixel data into an address in this manner takes advantage of performance gained with accessing "dynamic memory". By placing the more rapidly changing pixel values in the lower address bits paired with the column address bits of the dynamic memory, fewer row accesses are required. Row accesses are slower in dynamic memory due to the precharge time required. The present invention takes advantage of this performance improvement, but is not limited to the use of dynamic memory. Moreover, the values in the latching logic would preferably be updated at a data rate at least as high as the rate that output pixels are to be generated. Memory 50 is coded (preprogrammed) such that the brick is replicated to a point where the ending point of the brick lies on an output boundary of the memory locations. If the output memory is 3 bits wide (e.g., for 3× addressability), then the ending point would preferably be on the 3 bit boundary.

The coding in memory 50 also contains all combinations of thresholds for a given input pixel. This is possible since the input pixel value is included in the address to the memory. Given a current pixel value, Pix, and a current output state of the Sequencer, Addr, (see FIG. 7), the threshold decisions for multiple output pixels are thus determinable and preferably pre-programmed or coded into the memory. Subsequently, during use, one access to memory will retrieve many output pixels, potentially from several scan lines. In FIG. 8, which shows the replication of a brick in memory, eight output pixels ($O_n$) are retrieved at each access (e.g., 8 bits from a memory location). FIG. 8 also shows how the memory can be compressed by encoding of the brick data. In the topmost memory for a scanline the brick is first laid out in memory end-to-end, replicated to an output word boundary, until P rows ($R_{XO}$-$R_{XP}$) have been completed. Then the brick would normally be shifted and the process repeated as shown with the cross-hatched rows. However, each of these instances of the shifted brick can be located within the first instance. This is shown in FIG. 8 as points A,B,C along the topmost memory locations. Thus, while a memory intensive process would require additional memory to handle the various offsets (e.g., $R_{YO}$-$R_{YP}$, $R_{ZO}$-$R_{ZP}$, ...) the sequencer merely starts at a memory boundary determined as a function of the stored offset. This feature clearly reduces the total storage required to hold the dot, albeit requiring the "offset" feature of the Sequencer to realize this savings.

Parallel continuous tone pixels are implemented by replications of the portion of the codes required to generate the halftone dot for that particular pixel. FIG. 4 shows two continuous tone pixels being halftoned in parallel. However, the memory is preferably partitioned so that the section of memory that is addressed by each continues tone pixel contains the output pixels at the appropriate phase in the brick. There are several possible examples of implementations for continuous tone pixel parallelism. In the case of an application where pixel data is delivered to the halftone function from a data bus (32 or 64 bits wide), the width of the bus is used to reduce the clock rate for the halftone function. Pixel data can be taken directly from the data bus and halftoned 4 or 8 pixels in parallel. This would require that the memory section for each continuous tone pixel contain the portion of the halftone dot for that pixel. It will be appreciated by those skilled in the art that halftoning multiple continuous tone pixels will add further constraints on the alignment of the brick to the output pixel boundaries and potentially increase the replication length within the memory.

Figure 9:
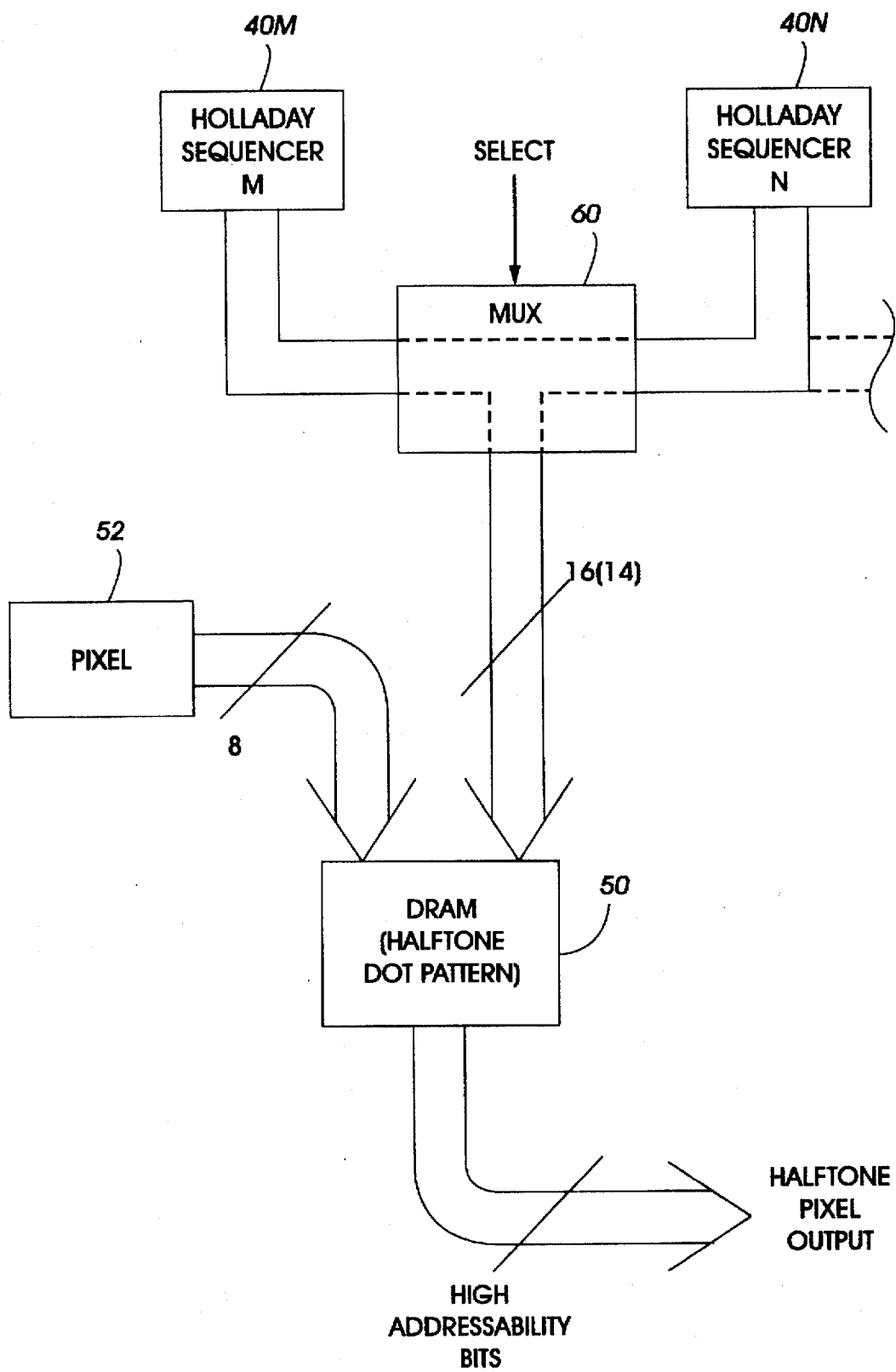
FIG. 9 is a block diagram of one embodiment of the present invention.

For some image processing applications it may be necessary to utilize multiple halftone screens within a single scan line. Note that this is not the same as storing multiple screens in memory which just requires a large address (i.e., wider Sequencer or alternatively bank switching). Referring now to FIG. 9, the key for multiple halftone screens to work is that for each screen, a Sequencer 40M, 40N, etc. (generating the "state" for indexing into the halftone screen) needs to be operating to ensure that the phase of each dot is maintained across and between scan lines. For each screen to be employed in a scanline a Sequencer 40 would be running through the {offset, end, start, end . . . } sequence, but only the output of one sequencer would be enabled to access memory. To select the particular screen and the resulting dot, the address for the Sequencer associated with that screen/dot is enabled to access memory via multiplexer 60, the select signal controlled as a function of the desired halftone screen pattern. At the same time the other Sequencers would be disabled, but their states would be advanced to the next count of the sequence. In this way, the halftone screen can be selected on a pixel by pixel basis. FIG. 9 is a diagram that shows this concept.

There is an issue with this feature when parallel continuous tone pixels are being halftoned. Since the Sequencer is being shared between the two continuous tone pixels, all continuous tone pixels that are being halftoned in parallel will change to the new screen. Depending on the application, this may not be desirable. For multiple screens, it may only be practical to implement the parallelism on the output binary pixels. An alternative embodiment could replicate the sequencers and lookup memory for each pixel and, by including a select tag (see FIG. 7) as part of the pixel value to select different screens.

Yet another alternative embodiment, capable of implementing a small number of screens, employs a single Sequencer with an additional tag bit into memory to select the screens. The count sequence in the fast scan direction would have to be selected to be the Least Common Multiple (LCM) of the set of lengths (L) for the bricks. In the slow scan direction depending on the shift (S) and row (P) parameters, there may be a significant amount of replication. In effect, the LCM is required because the shifted brick starts at the beginning of the scan line for each screen. This alternative may require significant increases in memory size as in general each screen may be large and the LCM is even larger (by definition). Accordingly, this implementation is not as efficient as maintaining one Sequencer per screen in terms of memory usage.

The instant invention may also be employed to implement a halftone apparatus that supports resolution enhancement or the selection of halftone screens based upon tags. Resolution enhancement, as used herein, is a technique seeks to accomplish finer edge placement using added resolution normally employed for adding levels to a halftone dot. Typically, resolution enhancement is used to eliminate staircase like structures on edges of characters and line art due to the low resolution of the rendering of the continuous tone pixels.

Figure 10:
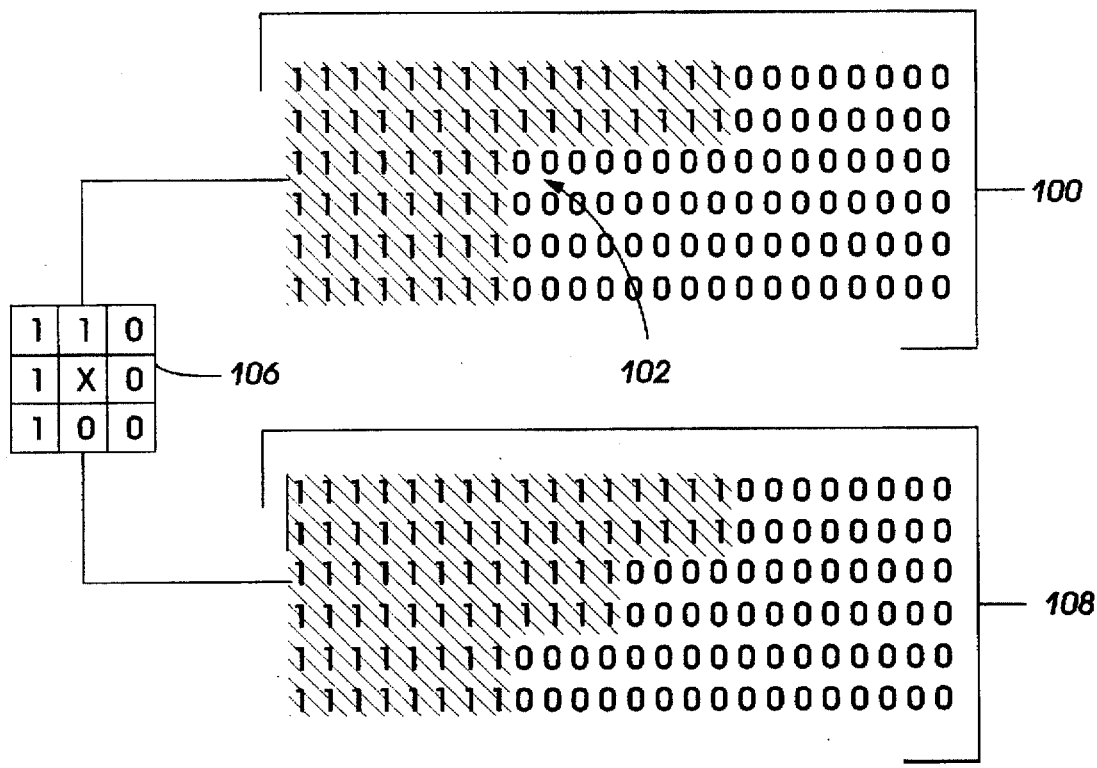
FIG. 10 is an example of a template-based resolution enchancement process.

A typical method for implementation of edge enhancement is to process the lower resolution image with a 3×3 template and output a tag that indicates what type of enhancement to apply. The 3×3 template is a threshold mask of the continuous tone pixels with a "1" for full density ink/toner, and a 0 for no ink. An example of this type of resolution enhancement is shown in FIG. 10. Depicted therein is an image segment 100, representing the output of a 3200×800 spi printing device, where no enhancement has been applied. One will appreciate that the region indicated by arrow 102 will result in a visually perceptible artifact as noted above. To overcome such an effect, it is known to process image segment 100 using a template based operation, represented by template 106, to enhance the image as represented by image segment 108.

Figure 7:
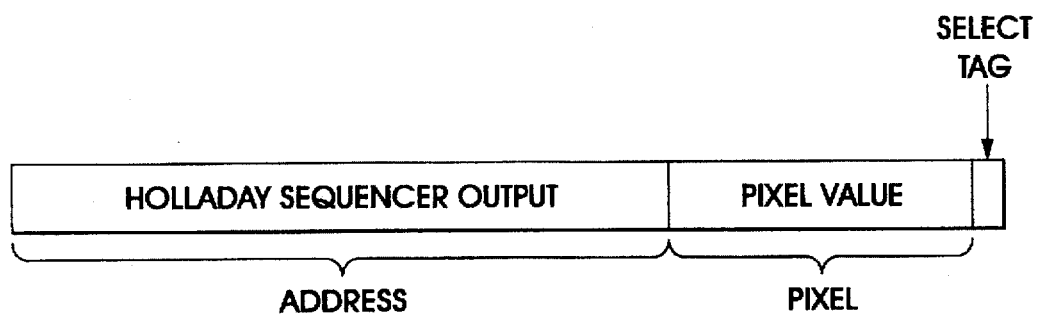
FIG. 7 is a simple illustration of the manner in which memory addresses are generated in accordance with one embodiment of the present invention.
Figure 8:
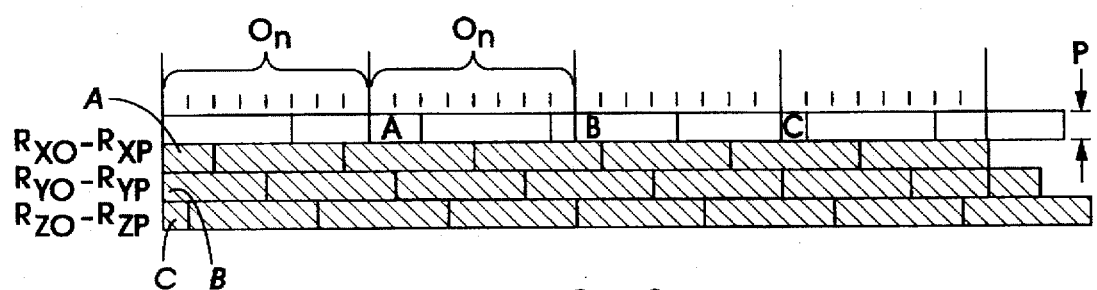
FIG. 8 is an example of memory storing the various halftone dot patterns and the relative memory savings accomplished in certain embodiments of the present invention.

A technique to implement the resolution enchancement feature as part of the halftone function previously described is to employ enhancement tags as a replacement for the pixel portion (Pix) of the memory block address previously described in FIG. 7. At the same time, a single bit tag is used to signify that the pixel portion of the address is now resolution enhancement information in the form of an enhancement code. This technique is simple to implement at the expense of doubling the memory. An alternate technique would be to combine the sequencer address and the tag bit to map a portion of the address range to look up enhancement codes. In this case, designated ranges of the address would be allocated to normal halftone generation, and other ranges to enhancement codes. The enhancement code is then employed in place of the pixel value to look up the coded output for a current state of the Sequencer. Generation of the enhancement code that is selected with the enhancement tag is based on the 3×3 (or alternatively sized region) low resolution image content and the characteristics of the output marking device. For example, a pre-filtering step on the image would locate an area such as in FIG. 10 (106). The code stored in memory would be based on the characteristics of the output device in "visually smoothing" this edge as in FIG. 10 (108). It will be appreciated by those skilled in the art that there are many other methods for generation of these pixel tags in addition to the one described.

Similarly, like the enhancement codes, other object tags may be selectively added or substituted into the composite address in response to the select tag, with or without the pixel value. This feature would enable alternate rendering for various image objects and may also be used for multiple screens, if they are integer multiples in frequency, without the use of multiple Sequencers as described previously.

For typical dot and line screens, the Sequencer width needs to be around 8–9 bits. Add to this the pixel (8 bits) and each screen can take up to 17 bits of address which is reasonable to implement in Static RAM (SRAM). Several alternative memory organizations and implementations are possible with this technique to optimize cost and performance in an image processing system.

Figure 11:
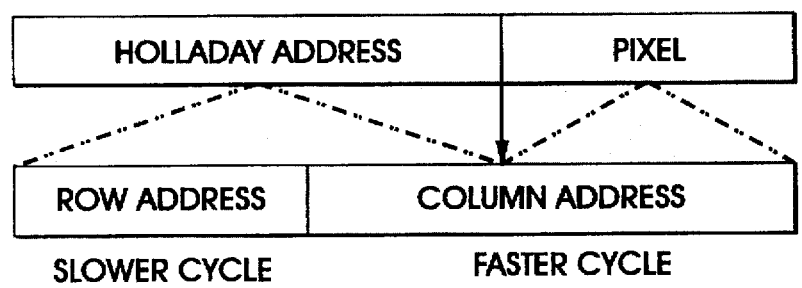
FIG. 11 is a further illustration of the memory address scheme employed for efficient memory access in accordance with an embodiment of the present invention.

With stochastic or super cell halftone screens, for example, the brick sizes increase to require an address of up to 24 bits. In this case, Dynamic RAM (DRAM) may be a more cost effective implementation. Further performance improvements can be achieved as a result of the fact that most DRAM memory has a multiplexed address that accesses the memory array at different speeds. The row address is a slower cycle than the column address, which often supports page and nibble. By splitting the address as shown in FIG. 11, the upper portion of the address generated by the Sequencer, that does not change much on a pixel-by-pixel basis, is placed in the row address. The pixel and less significant part of the Sequencer are placed in the column address. Part of the Sequencer must be in the column address to reflect the change in the state of the halftone cell position.

Figure 12:
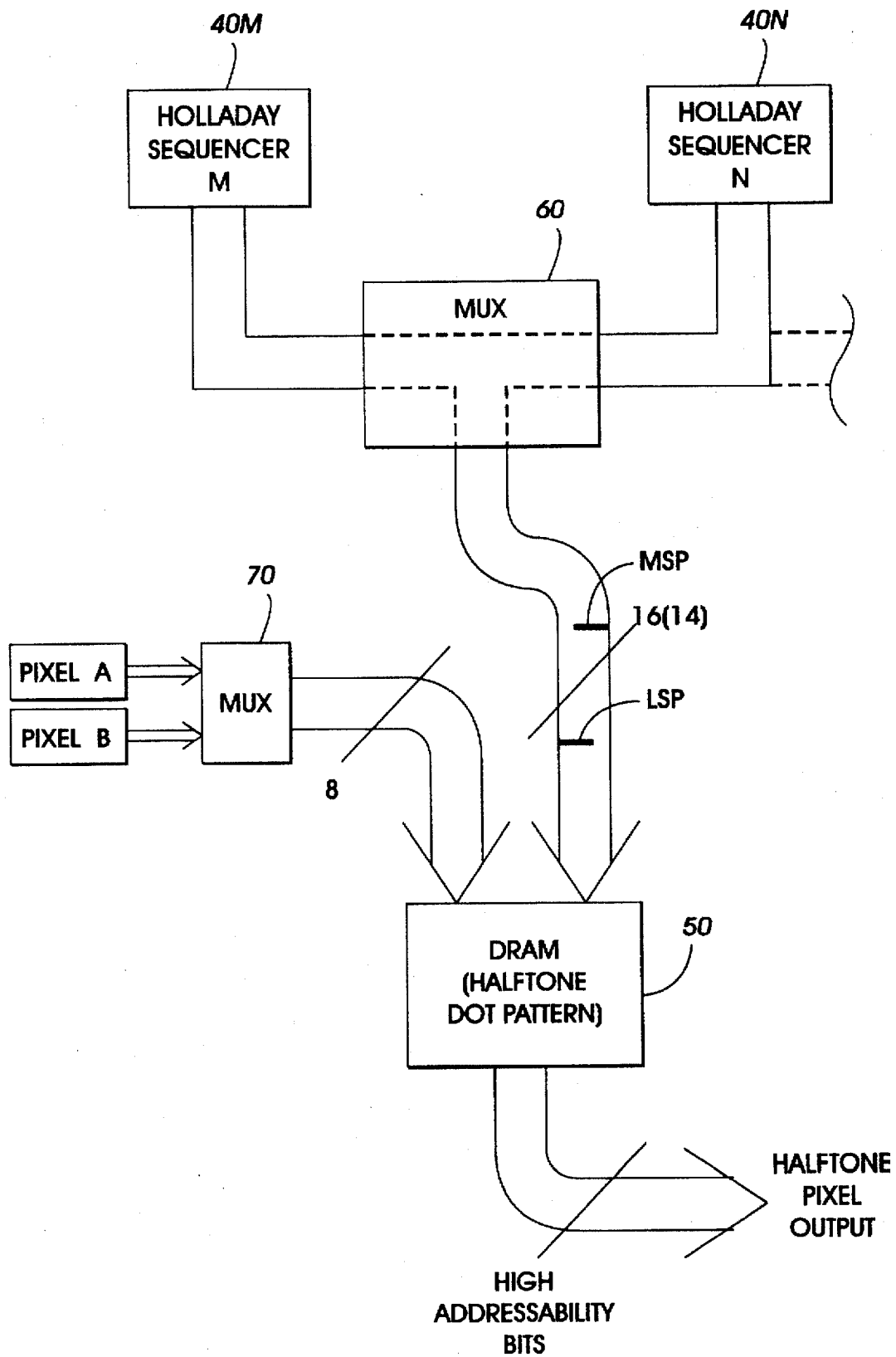
FIGS. 12 and 13 are block diagrams of alternative embodiments of the present invention.

As further illustrated in FIG. 12, the pipelining of adjacent pixels, A and B, improves the speed of the system when using page- or nibble-mode DRAMs since on the first address cycle the most significant parts (MSP) of the Sequencer address, common to both pixels, is sent. Then on subsequent cycles individual pixel values (A, B), along with the less significant, remaining portion of the Sequencer address (LSP), are combined and sent for access. As indicated in the figure, a multiplexer 70, or equivalent pixel selection control circuitry such as a multiplexed bus structure, is employed to select the input applied to the memory on a pixel-by-pixel basis. As will be further appreciated by those skilled in the art, additional logic and control circuitry may be necessary to provide for the appropriate sequencing and combination of the pixel values and the LSP data from the Sequencer. Furthermore, the sequences must be arranged so that the adjacent pixels only change the lower bits of the address. This may lead to replication of the halftone cell for small Holladay halftone cells, however larger cells can be constructed to efficiently support this requirement.

Figure 13:
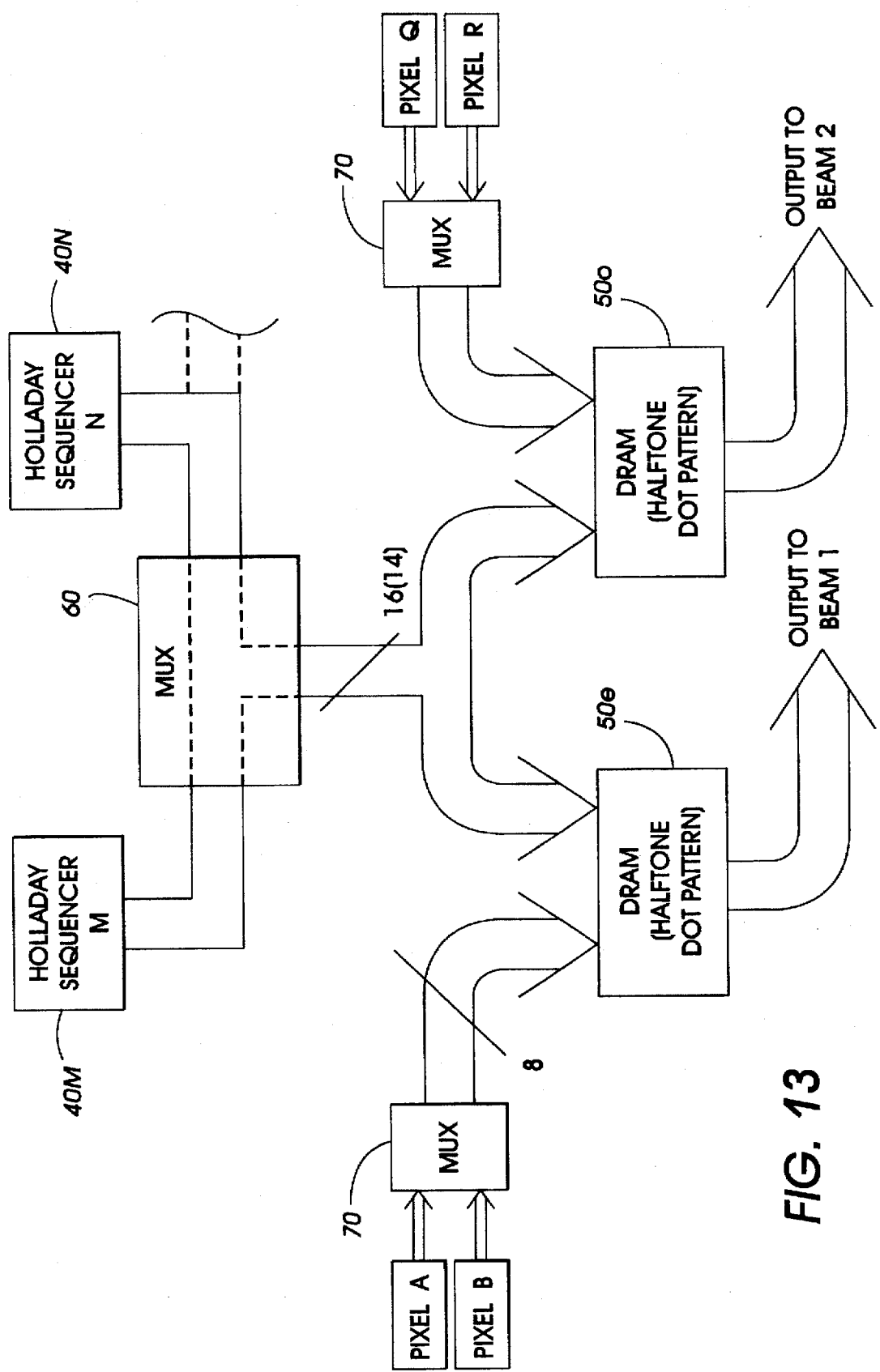

Turning now to FIG. 13, the architecture of the image halftoning apparatus 80 depicted therein becomes superscalar when pixels are taken two at a time and processed by dual memories. Specifically, a plurality of sequencers 50 provide sequence address data to be combined with pipelined pixel data (A,B or Q,R) via multiplexers 70, the resultant addresses being employed to control access, in parallel, to memories 50e and 50o for the generation of the parallel (e.g., even/odd) output data to drive the beams of a laser printing device. For example, with a dual beam ROS, the output pixels would be taken from the same pixel location but from even and odd scan lines. In this embodiment, even and odd lines of the halftone cell (brick) would be separately stored in the two memories, 50e and 50o respectively, avoiding redundant memories. For this efficiency to be realized, the larger halftone cells must have an even number of scanlines. The large cells are for stochastic screens which are generally built with an even scan count.

Recognizing that many halftone screens may only use twenty to thirty memory locations for each scan line an alternative lower-cost cache implementation is also possible. Such an alternative embodiment (not shown) would use two high speed SRAM's to provide the halftone code memory during the processing of a scan line. One SRAM cache would be active during the current line, while at the same time the second SRAM cache would be loading from a slower DRAM or PROM/ROM. The lower performance RAM may contain up to 16 million locations, as would be required for some stochastic screens, but the cache may only require between 4K and 64K locations. As will be appreciated, for such an embodiment to work, the time to halftone process a scan line plus over scan time must be larger than the time to load the SRAM cache. The advantage of this alternative embodiment is that the high speed SRAM is generally more costly than DRAM or PROM/ROM memory and minimization of the amount of SRAM employed would further lower the cost of the image halftoning apparatus. As will be further appreciated other potential implementations using a hierarchical memory concept may be employed to reduce the requirements for the entire halftone dot pattern memory (50) to run at high speed.

Although the output of the halftone dot pattern memory has been described and illustrated as binary (high addressability) pixels in the above description, it will be appreciated that the apparatus described above is extensible to other outputs. For example, the memory could hold codes such as Pulse-Width Position Modulated (PWPM) codes instead of binary pixels. The PWPM codes are merely one example of a multi-bit code that represents how a marking mechanism (e.g., laser) is to be modulated on and off to produce an output pixel. In the case of PWPM output, the code specifies the width (duration) of the exposure or mark and enables positioning the variable size output within a pixel boundary. Another example is where the code specifies a level for an imaging device that employs analog intensity modulation such as an LED print bar.

In recapitulation, the present invention is a super-scalar method and apparatus for the generation of halftone dot patterns in an image processing system. The super-scalar design employs at least one block of memory for the storage of at least one predetermined halftone dot pattern across a plurality of unique locations therein, and a sequencer for producing an index into said memory as a function of the position of the pixel along a scan line and the halftone dot characteristics. Also included is memory addressing circuitry, to combine the index produced by said sequencer and a pixel value for the pixel to produce a memory address, the memory address being thereby employed to access one of said locations in memory and to cause said memory to output a signal representative of a portion of the halftone dot pattern stored at the unique addressed location.

It is, therefore, apparent that there has been provided, in accordance with the present invention, a method and apparatus for patterned halftone generation. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for the parallel processing of continuous tone pixels to produce a halftone output signal representing the continuous tone pixels, comprising:
   a memory block storing at least a portion of a halftone dot pattern at a plurality of locations therein;
   a sequencer for producing an index into said memory as a function of a position of the pixel relative to the halftone dot pattern; and
   memory addressing circuitry for combining the index produced by said sequencer and a pixel value for the pixel to produce a memory address, the memory address being thereby employed to access one of said plurality of locations in memory and to cause said memory to output a signal according to the halftone dot pattern.

2. The apparatus of claim 1, wherein the memory block is preprogrammed to contain halftone dot patterns, corresponding to a plurality of thresholds, each threshold corresponding to an output pixel location, for a given input pixel value, so that a single memory access delivers the data to produce a plurality of output pixels.

3. The apparatus of claim 2, wherein the output of at least two memory blocks is passed to a selection circuit for selection of the output of only one memory block.

4. The apparatus of claim 3, wherein the selection circuit selects the output on a pixel-by-pixel basis.

5. The apparatus of claim 4, wherein the selection is a function of an image type within a region of the image.

6. The apparatus of claim 4, further comprising:
   image segmentation means for dividing an input image including the continuous tone pixels into a plurality of segments and identifying an image type for each of the plurality of segments based upon an analysis of the the continuous tone pixels within a segment.

7. The apparatus of claim 1, further including:
   at least one additional sequencer producing a second index to said memory addresses as a function of a position of the pixel and a second halftone dot characteristic; and
   means for selecting, in response to a selection signal, the index output from one of the plurality of sequencers for combination with the pixel value to access a unique location in said memory.

8. The apparatus of claim 1, wherein the sequencer comprises:
   circuitry for pre-computing a phase and repeat frequency as a function of the halftone dot pattern parameters; and
   a dot address sequencer, responsive to the phase and repeat frequency, for producing an index for the pixel.

9. The apparatus of claim 1, wherein said memory block comprises unique locations, coded such that a sequence of data representing a halftone dot pattern is replicated across a plurality of contiguous locations.

10. The apparatus of claim 9, wherein the memory coding is such that the ending point of the halftone dot pattern lies on a boundary of at least one of the memory locations for a particular row of the halftone dot pattern to maintain the phase of the precomputed halftone pattern by repeatedly sequencing a block of memory indexes for a given row.

11. The apparatus of claim 1, wherein the memory address generated is composed of an enhancement code to enable the output of a resolution enhanced image structure.

12. The apparatus of claim 1, wherein said memory is memory that is addressable using separate column and row addresses and where said sequencer indexes the memory block that contains the halftone dot patterns by changing only the row address.

13. A method for parallel processing pixel values for at least two continuous tone pixels to produce a plurality of binary signals representing at least two continuous tone pixels, comprising:
   preprogramming halftone dot patterns at a plurality of unique locations in memory; and
   producing an index into said memory as a function of a position of the pixel and the halftone dot characteristics;
   combining, with the index, a pixel value for the pixel to produce a memory address; and
   using the memory address, accessing a location in said memory blocks, thereby causing the memory to output a signal representative of a portion of the halftone dot pattern stored at the accessed memory location.

14. The method of claim 13, wherein the preprogramming step programs the memory to contain halftone dot patterns, corresponding to a plurality of combinations of thresholds for a given input pixel value, so that a single memory access may produce a plurality of output pixels.

15. The method of claim 13, further including the steps of producing a second index as a function of a position of the pixel and a second halftone dot characteristic; and selecting the first or the second index for combination with the pixel value to access a unique location in said memory.

16. The method of claim 13, wherein the step of producing an index comprises:

pre-computing a phase and repeat frequency as a function of the halftone screen parameters; and producing sequentially, in response to the phase and repeat frequency, an index for the pixel.

17. An apparatus for the parallel processing of continuous tone pixels to produce an encoded output signal, where the encoded output signal may be employed to drive an image output device to produce a representation of the continuous tone pixel, comprising:

a memory block storing at least a portion of an encoded pattern at a plurality of unique locations therein;

a sequencer for producing an index into said memory as a function of a position of the pixel within the image; and memory addressing circuitry for combining the index produced by said sequencer and a pixel value for the pixel to produce a memory address, the memory address being thereby employed to access one of said locations in memory and to cause said memory to output the encoded output signal.

18. A method for parallel processing continuous tone pixels to produce a plurality of halftone signals, comprising:

precomputing halftone thresholds such that a halftone fill order can be completely specified with an independent pattern for each halftone level;

storing the precomputed thresholds in a memory;

producing a memory address as a function of a position of the pixel, the halftone dot, and a pixel value; and using the memory address, accessing the memory, thereby causing the memory to output a halftone signal stored at the accessed memory location.

* * * * *